United States Patent [19]
King

[11] Patent Number: 5,040,467
[45] Date of Patent: Aug. 20, 1991

[54] STOWABLE PATIO

[76] Inventor: Lanora G. King, P.O. Box 72275, Las Vegas, Nev. 89170

[21] Appl. No.: 577,061

[22] Filed: Aug. 31, 1990

Related U.S. Application Data

[63] Continuation of Ser. No. 327,009, Mar. 22, 1989, abandoned.

[51] Int. Cl.$^5$ .............................................. A47B 23/00
[52] U.S. Cl. ........................................ 108/42; 108/44; 5/119
[58] Field of Search ...................... 108/42, 44, 48, 63, 108/77; 5/118–119

[56] References Cited

U.S. PATENT DOCUMENTS

| | | | |
|---|---|---|---|
| 1,377,852 | 5/1921 | Patterson | 5/119 |
| 2,160,958 | 6/1939 | Critchlow | 108/44 X |
| 2,170,987 | 8/1939 | Chambers | 5/119 |
| 2,451,275 | 10/1988 | Cercownay | 108/44 X |
| 2,471,730 | 5/1949 | Doerr | 108/44 X |
| 2,567,104 | 9/1951 | Di Fonzo | 108/44 X |

FOREIGN PATENT DOCUMENTS 2365979 6/1978 France .................... 108/77

Primary Examiner—Peter A. Aschenbrenner
Attorney, Agent, or Firm—Frost & Jacobs

[57] ABSTRACT

A stowable patio for use with an RV having a pair of spaced-apart support members, each member carrying an inclined roller track, a platform disposed between the support members which carries rollers disposed adjacent the roller tracks, whereby its patio may be moved between a stored position and an extended position.

10 Claims, 8 Drawing Sheets

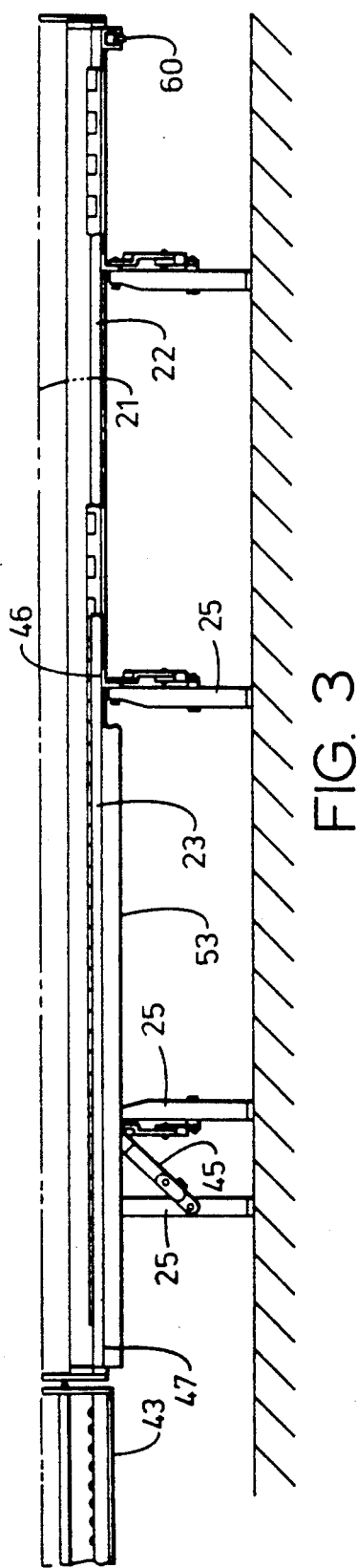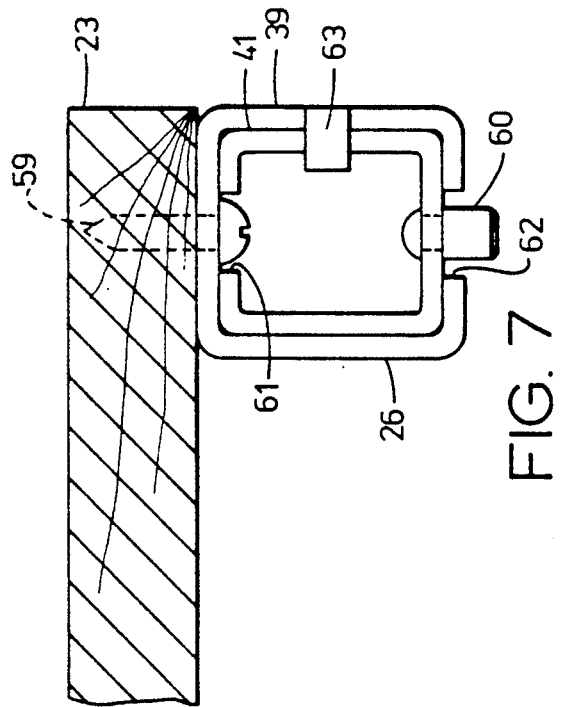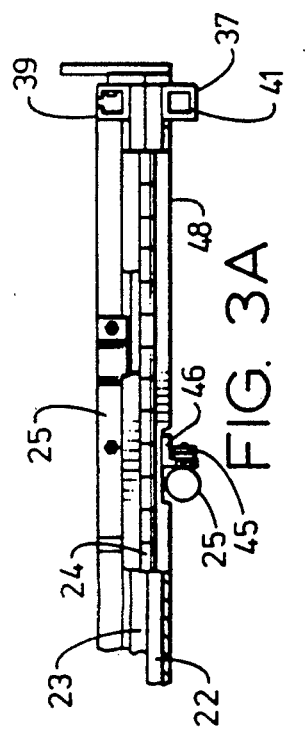

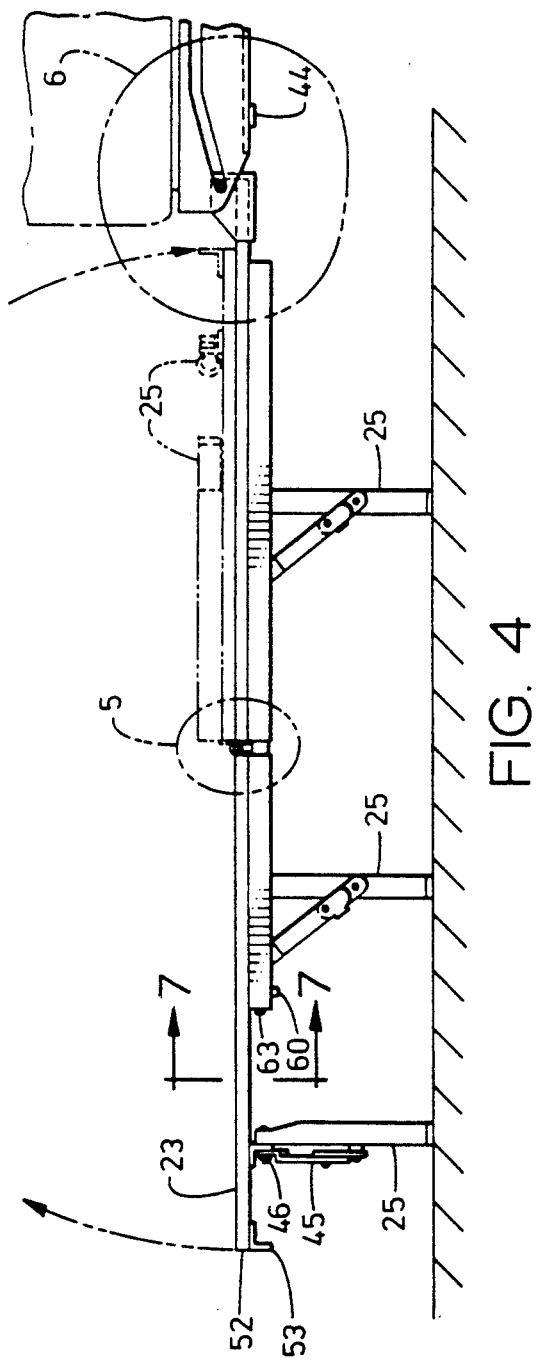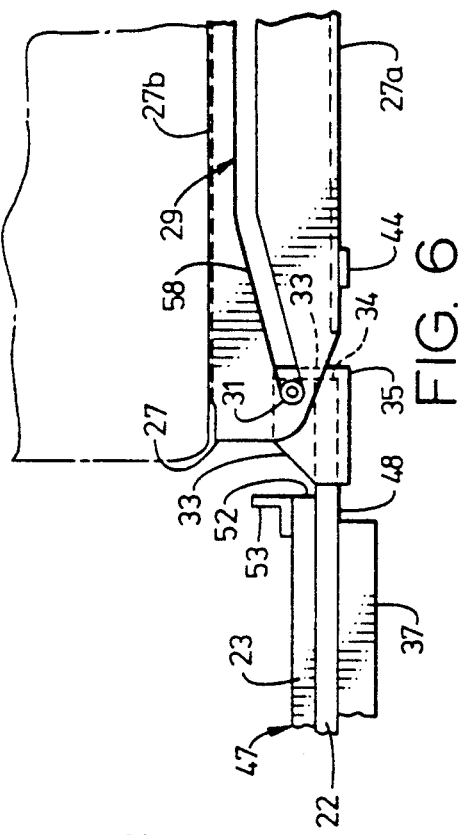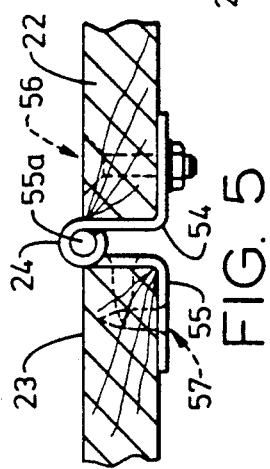

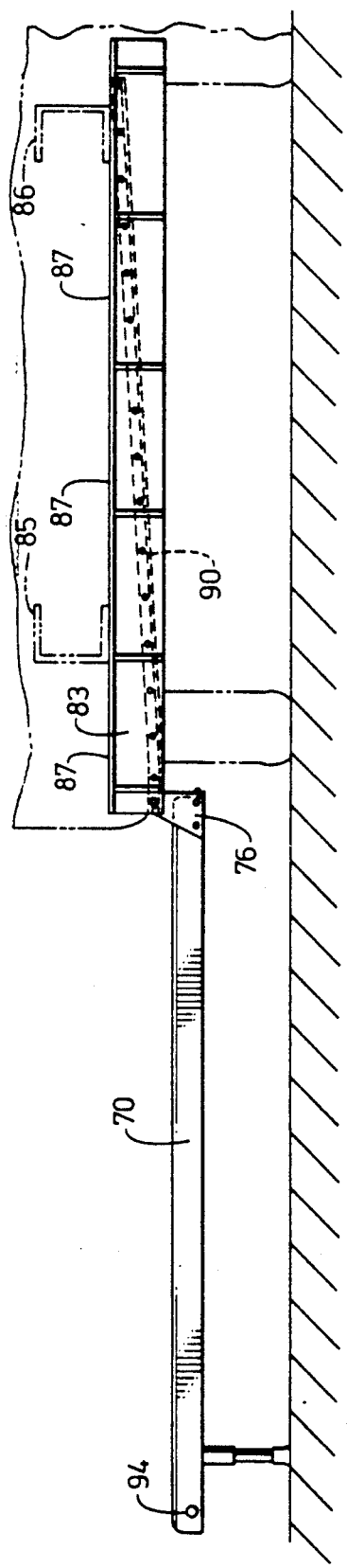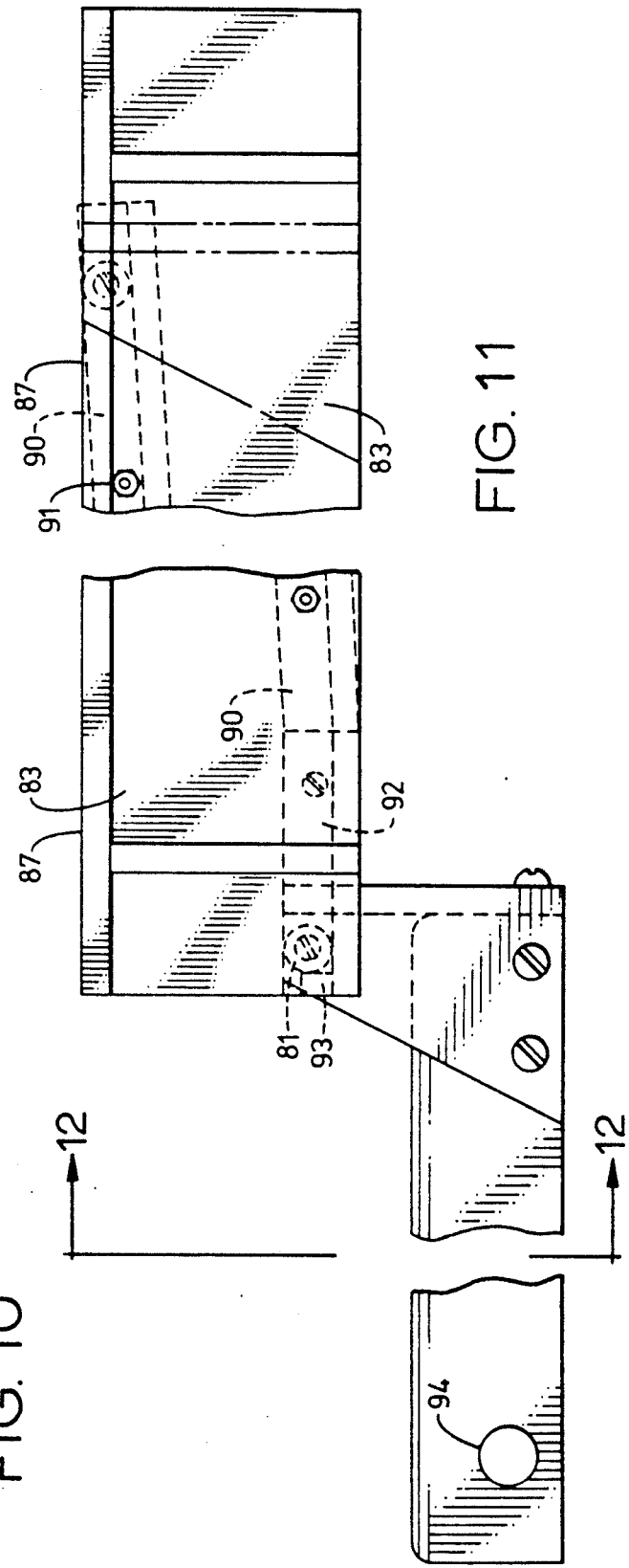

STOWABLE PATIO

This is a continuation of application Ser. No. 07/327,009, filed Mar. 22, 1989, now abandoned.

TECHNICAL FIELD

The present invention relates generally to stowable patios and is particularly directed to stowable patios for recreational vehicles, which may be easily and conveniently extended for use when the recreational vehicle is stationary. The invention will be specifically disclosed in connection with a support assembly which bearingly supports the slidable patio. The patio is disclosed as being one or more pieces.

BACKGROUND OF THE INVENTION

The sale and use of recreational vehicles has increased dramatically over the last several decades. They are convenient alternatives to passenger cars and hotel rooms. The term "recreational vehicle" (RV) is used to describe any type of occupiable structures adapted to be transported on roads and highways. RV, as used herein, includes motorhomes; mobile manufactured and doublewide homes; travel trailers; fifth-wheels; pop-ups; vans; customized vans; coaches; and bus-like vehicles. Such structures, once a particular destination is reached, may be left in a stationary position and occupied for any period of time.

When a recreational vehicle is located at a stationary place, whether for only a few minutes or for months or years, people, in good weather, typically like to spend some time outside of the recreational vehicle. Frequently, they will lounge about on chairs located directly on the ground near the recreational vehicle. There are, however, times when the weather is inviting enough to spend leisure time outdoors, but the ground conditions are muddy or wet or in similar undesirable conditions. The ground may also have a terrain which is not particularly convenient to locating chairs and other objects on.

Under such circumstances, people may erect patios which have been stored in or on a recreational vehicle. In the past, such patios have been located in various places inside and outside of the recreational vehicle. Such patios have occasionally been located underneath the recreational vehicle mounted on frames secured to the chassis. Such patios have not been particularly popular due to the limitation of the sizes which the patios are manufactured in. The size is typically limited by the space available underneath the vehicle. Another problem has been the complexity and difficulty in erecting the patios, either those which are stowed underneath the vehicle or those which are stowed elsewhere on the vehicle.

The inventor has developed a unique stowable patio which can accommodate almost any recreational vehicle and overcome the limitations of size and complexity of setup. The present invention incorporates a patio which carries rollers that slide on an inclined track secured to the chassis. This allows the patio to be stowed as closely as possible to the bottom of the chassis, preserving ground clearance and preventing accumulation of large particles of road debris between the patio and chassis. The patio may also be in one or more parts, hinged together, which allows the size of the extended patio to be less dependent on the space limitations dictated by the chassis. As will be described below in conjunction with the preferred embodiment, the invention is easy to extend, thereby resulting in greater utility and use.

SUMMARY OF THE INVENTION

Accordingly, it is a primary objective of the present invention to provide a simple, easy to extend and use, reliable stowable patio which may be located underneath the chassis of a recreational vehicle.

It is another object of the present invention to provide a patio which may be stowed such that the size of the patio is not unreasonably limited by the space below the chassis.

It is yet another object of the invention to provide a patio which minimizes the accumulation of road debris that can be lodged between the patio and the chassis as a result of traveling while the patio is in a stored position.

Additional objects, advantages and other novel features of the invention will be set forth in part in the description that follows and in part will become apparent to those skilled in the art upon examination of the following or may be learned with the practice of the invention the objects and advantages of the invention may be realized and obtained by means of the instrumentalities in combinations particularly pointed out in the appended claims.

To achieve the foregoing and other objects, and in accordance with the purposes of the present invention as described herein, a stowable patio is provided which includes a pair of spaced-apart support members which are located horizontally and have first and second roller tracks attached thereto, respectively. Each of the roller tracks are oriented in an inclined relation to the upper surface of the support members, and are generally parallel to each other. A platform is slidably disposed between the support members which is movable between a stored position and an extended position. A first leg is secured by its base to the platform, and the distal end of the leg carries at least one roller which is disposed adjacent the first roller track. A second leg is secured similarly to the platform at a position where a roller carried by a second leg is disposed adjacent the second roller track, whereby the platform may be moved between the stored and extended positions.

According to a further aspect of the invention, a second platform is pivotally connected to the first platform such that the second platform may be moved between a stored position and an extended position in relation to the first platform.

In yet another aspect of the invention, a plurality of legs extending downward from the platforms are provided for support.

In accordance to yet another aspect of the present invention, the legs are movable between an extended position and a stored position.

In a still further aspect of the present invention, the legs are designed to be self-leveling, as it is well known in the art.

In yet another aspect of the invention, the self-leveling legs are automatically self-leveling.

In a still further aspect of the present invention, means are provided for temporarily locking the second platform into the extended position.

In yet another aspect of the invention, the self-locking means includes a first locking member secured to the first platform, a second locking member secured to the second platform, and means for preventing relative motion between the first and second locking members.

In accordance with another aspect of the invention, a plurality of legs are located on the second platform.

In a still further aspect of the present invention, the platform is comprised of two or more sections, pivotally secured to each other and supported by a pair of spaced support members having roller tracks thereon.

According to a further aspect of the present invention, the stowable platform heretofore described is used in combination with a recreational vehicle.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification is various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is a fragmentary side view taken along line 3 of FIG. 2, showing, in fragment, the patio and the extended position, and the stowed position.

FIG. 3a is a fragmentary side view of the two-piece patio of FIG. 2, shown with the patio folded.

FIG. 4 is a side view of the patio taken along line 4 of FIG. 2, showing the patio in the extended and locked position.

FIG. 5 is an enlarged, fragmentary view of the pivot connection between the two portions of the patio shown in circle 5 of FIG. 4.

FIG. 6 is an enlarged, fragmentary side view of the inclined roller track shown in circle 6 of FIG. 4.

FIG. 7 is a partial cross-sectional view of the locking means taken along line 7—7 in FIG. 4.

FIG. 10 is a side view of the patio in the extended position taken along lines 10 of FIG. 8.

FIG. 11 is an enlarged fragmentary partial cross-sectional view of the inclined roller track and one-piece patio of FIG. 10.

Reference will now be made in detail to the present preferred embodiment of the invention, an example of which is illustrated in accompanying drawings.

DETAILED DESCRIPTION OF THE PREFERRED EMBODIMENT

Figure 1:
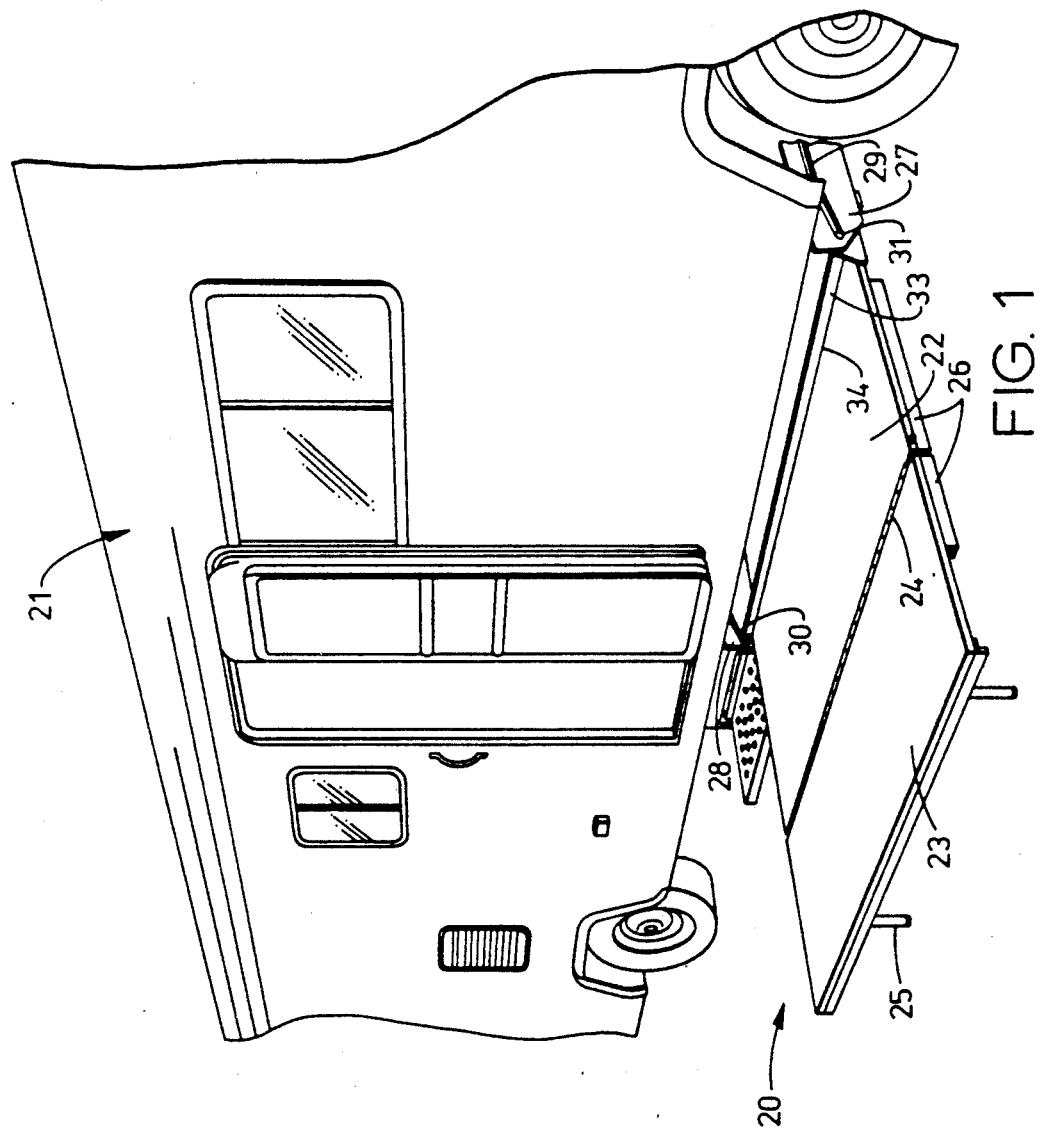
FIG. 1 is an elevational view of a stowable patio in accordance with the present invention in the extended position, adjacent a recreational vehicle.

Referring now to the drawings, FIG. 1 shows a patio 20 in an extended position adjacent a recreational vehicle 21. The patio is shown having a first platform 22 which is pivotally connected to a second platform 23 by a hinge 24. The second platform 23 is shown having a plurality of legs 25 depending downwardly therefrom. A slidable locking mechanism 26 is shown located underneath first platform 22 and second platform 23.

A pair of spaced-apart support members 27, 28 are shown having roller tracks 29, 30, respectively, which support rollers 31 and 32 (not shown). Rollers 31, 32 are rotatably mounted to frame 33, which is secured to edge 34 of first platform 22.

Figure 2:
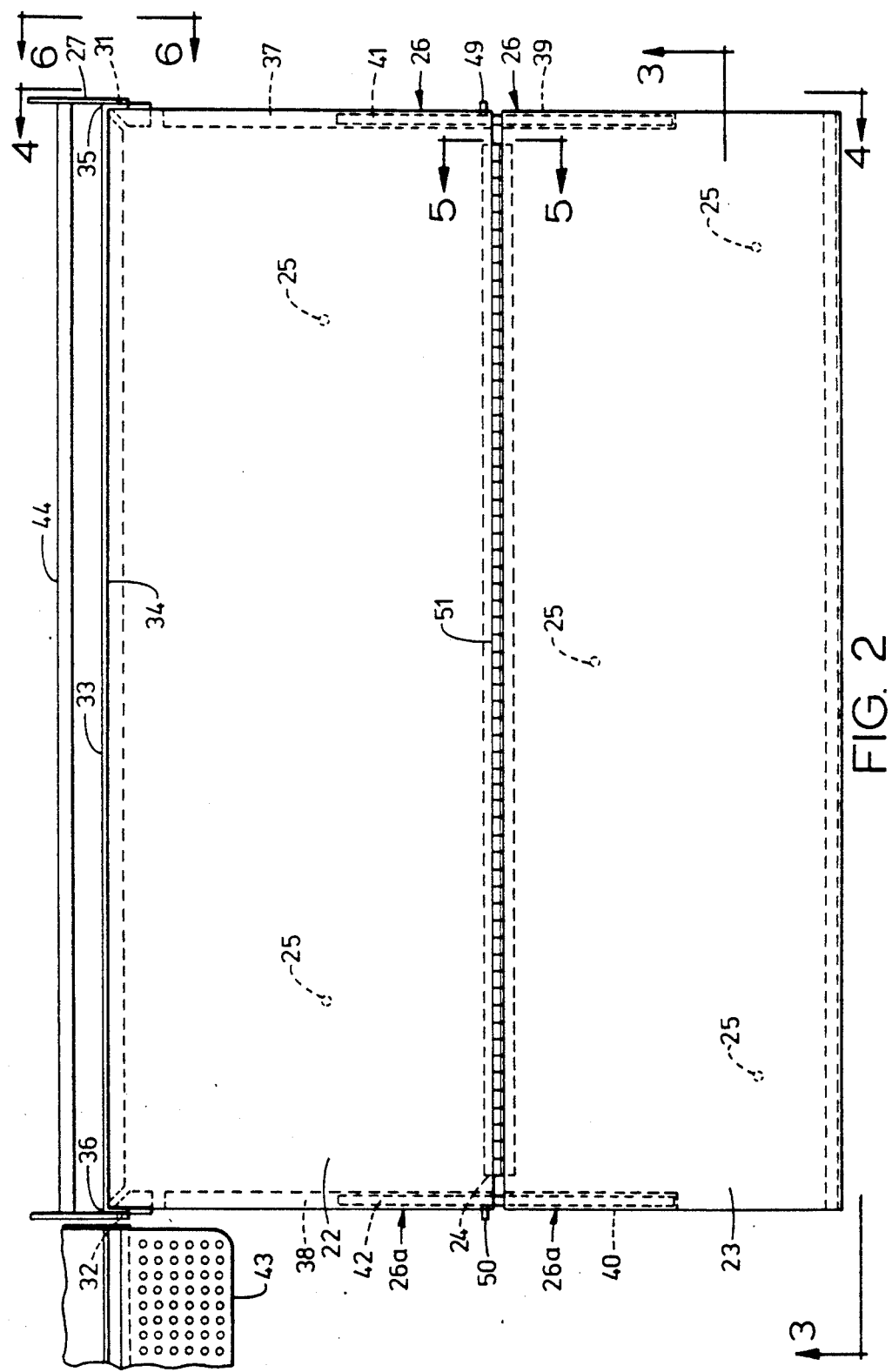
FIG. 2 is a top view of the two-piece stowable patio shown in FIG. 1.

Referring to FIG. 2, which is a top view of the two-piece patio 20 shown in FIG. 1, first platform 22 is shown having opposing corners 35 and 36 at either end of edge 34. Frame 33 is secured to first platform 22 along the entire length of edge 34. Frame 33 may also wrap around corners 35, 36, respectively, for additional support. At either opposing corner 35, 36, rollers 31, 32, respectively, are shown having reached the extended position in roller tracks 29, 30, respectively, when the patio 20 is in its fully extended position. Locking mechanisms 26 and 26a are shown on either side of patio 20, comprised of first locking members 37, 38, which are immovably secured to the bottom side of first platform 22. These locking members 37, 38 are shown as rectangular tubes disposed along opposing edges of platform 22. Second locking members 39, 40 are immovably secured to the bottom side of second platform 23, and are aligned with the first locking members 37, 38, respectively. Second locking members 39, 40 are also shown as rectangular tubes, having a cross-section approximately equal to the cross-section of first locking members 37, 38. Third locking members 41, 42 are slidably disposed in, and carried by, first locking members 37, 38, respectively. Third locking members 41, 42 are shown as rectangular tubes, having a cross-section such that it may be disposed in the interior portion of first locking members 37, 38, as well as second locking members 39, 40.

When the patio is in the fully extended positions, third locking members 41, 42 are moved to a position as shown in FIG. 2 where they are disposed partially in first locking members 37, 38, and partially disposed in second locking members 39, 40, respectively. This position of third locking members 41, 42 prevents relative motion between first locking members 37, 38 and second locking members 39, 40, respectively, thereby locking second platform 23 in the extended position with respect to first platform 22.

In order to pivot second platform 23 to a stored position with respect to first platform 22, third locking members 39, 40 are slid to a position where they are disposed entirely within first locking member 37, 38, respectively, thereby allowing relative motion between first locking members 37, 38 and second locking members, 39, 40, respectively. Although as described herein and illustrated in the accompanying figures, the locking mechanism 26 is shown as being a plurality of rectangular tubes, it should be clear that any such mechanism would prevent relative rotation of second platform 23 with respect to first platform 22 would constitute a locking mechanism 26. It should also be clear that platform 23 may be pivotably attached to any edge of platform 22.

Legs 25 are shown as dotted circles, depending downwardly from first platform 22, and second platform 23. The number of legs used depend on the amount of support and location of those supports. Referring to FIG. 3, legs 25 are pivotally connected to the bottom 47 of either platform 22 or 23, by bracket 46. Legs 25 are held in an extended position by folding angled support member 45. Leg 25 may be rotated into a stored position adjacent bottom 47, 48 of platforms 23, 22, respectively, by folding support member 45 and rotating leg 23 about bracket 46. This locates leg 25 in a position as shown in FIG. 3A. Legs 25 may be adjustable in length, by any means as is known in the art.

Referring again to FIG. 2, a step 43 is provided adjacent the recreational vehicle 21, from which a person may step from the door of the recreational vehicle 21, onto the step 43 and onto patio 20. It should be clear, however, that step 43 is by no means necessary to the practice of this invention.

When patio 20 is to be stowed, locking mechanism 26 is disengaged and second platform 23 is pivoted about hinge 24 to a position parallel to and adjacent the top of first platform 22, as shown in FIG. 3a. Legs 25 may be rotated into a stored position at this time. The folded patio 20 is pushed under the recreational vehicle 21, causing rollers 31, 32 to roll or slide in roller tracks 29, 30, (see FIG. 6) respectively, along the length of support members 27, 28, respectively. Once fully stored, patio 20 may rest on support strap 44 which is located between support members 27 and 28. The patio may be clamped or clipped to strap 44 so that it may not be unintentionally extended, particularly during transport of the recreational vehicle 21. Optionally, it is possible to provide extendable pins 49, 50 at either side of edge 51 of first platform 22. Pins 49 and 50 may be collapsed and, when reextended, disposed within roller track 29, 30, respectively. Means may be provided to prevent unintentional collapsing of the pins 49 and 50, thereby preventing unintentional extension of the stored patio 20.

Referring to FIG. 3A, patio 20 is shown with second platform 23 in a stored position relative to first platform 22 and legs 25 also in a stored position.

FIG. 4 shows the arc traveled by edge 52 of second platform 23 during its rotation from the extended position to the stored position relative to first platform 22. The stored position of second platform 23 is shown in phantom lines in FIG. 4, adjacent to the top of first platform 22. A support member 53 is shown adjacent edge 52, and may be used in any location on platform 23 or 22 as is necessary.

FIG. 5, which is an enlarged view of circle 5 of FIG. 4, shows hinge 24 which pivotably connects second platform 23 with first platform 22. Although shown in a longitudinal direction, it is within the scope of this invention, that hinge 24 may also be located in the lateral direction, perpendicular to the direction as shonw in FIG. 2. Hinge 24 is shown in FIG. 5 as being comprised of two angled brackets 54, 55, connected by a pin 55a.

Two alternative methods are shown for fastening either angle bracket 54, 55 to either platform 22, 23. At 56, a threaded bolt is shown passing entirely through platform 22, secured by a nut adjacent angle bracket 54. A plurality of such bolts 56 are provided as is necessary.

At 57, a plurality of threaded screws are shown being used to secure angle bracket 55 of hinge 24 to platform 23. Either method may be used successfully, the quantity and size of the threaded members being dictated by the design criteria. Additionally, although hinge 24 is shown as a single hinge running almost the entire length of edge 51, it may be a plurality of individual hinges disposed adjacent platforms 22 and 23.

FIG. 6 is an enlarged view of circle 6 of FIG. 4, showing the roller track 29 of support member 27. As previously described, roller 31 is rotatably connected to frame 33. Frame 33 carries edge 34 of first platform 22. Shown in FIG. 6 is corner 35 wherein roller 31 is disposed in an inclined portion 58 of roller track 29. Roller 31 is shown in its position when patio 20 is fully extended. The inclined portion 58 of roller track 29 allows the patio to be carried as close to the bottom of the chassis of RV 21 as is possible, while preserving maximum ground clearance and permitting the patio 20 to assume a convenient position in height relative to the bottom of the RV 21.

Figure 13:
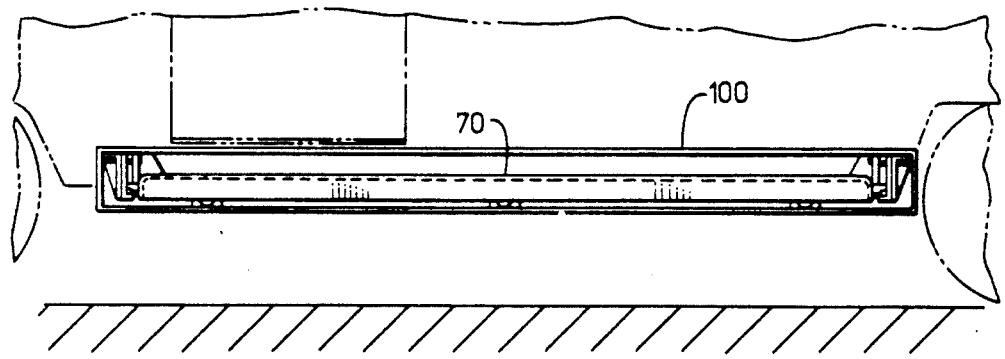
FIG. 13 is a side view of the patio stored in an enclosure.

By stowing patio 20 close to the chassis, large road debris cannot become lodged between the chassis and patio 20. As shown in FIG. 13, the patio 20 or 70 may be stowed in enclosure 100 below the RV, attached to the chassis. The mounting of the patio may be used unchanged in principle and operation even with enclosure 100.

Additionally, while in the fully extended position, roller 31, and therefore edge 34 are at the lowest possible position in roller track 29. This inhibits horizontal movement of patio 20 when in the fully extended, in-use position, thereby providing a stable patio not susceptible to unwanted or unintended horizontal displacements. Inclined portion 58 is shown as being the last part of roller track 29. Alternatively, the entire length of roller track 29 may be inclined, as shown in the second preferred embodiment described below.

Roller track 29 is shown formed in support member 27. Member 27 must therefore have a cross-sectional shape and thickness sufficient to provide structural support for patio 20. The present embodiments utilize a U-shaped cross-section, opening toward the patio storage space under the RV, as indicated by dotted lines/2 flanges 27a, 27b. These flanges 27a, 27b may, of course, open outwardly instead, still providing adequate support. Other shapes and orientations are within the scope of this invention.

Referring now to FIG. 7, which is taken along line 7—7 of FIG. 4, locking mechanism 26 is shown in an end view in the locked position. Second locking member 39 is secured to second platform 23 by threaded fasteners 59. Third locking member 41 is shown disposed within the interior of second locking member 39. An opening 61 in the top of third locking member 41 is provided for clearance for the head fastener 59, which secures second locking member 39 to platform 23. This may be as a longitudinal slot either the entire length of third locking member 41 or a portion thereof. Pin 60 is secured to the bottom wall of third locking member 41, and extends through opening 62 located in the adjacent wall of second locking member 39. Opening 62 is shown as a slot large enough to accommodate pin 60, running the length of second locking member 39 or portion thereof. A stop 63 extending into the interior of second locking member 39 is provided to prevent overtravel of third locking member 41.

Figure 8:
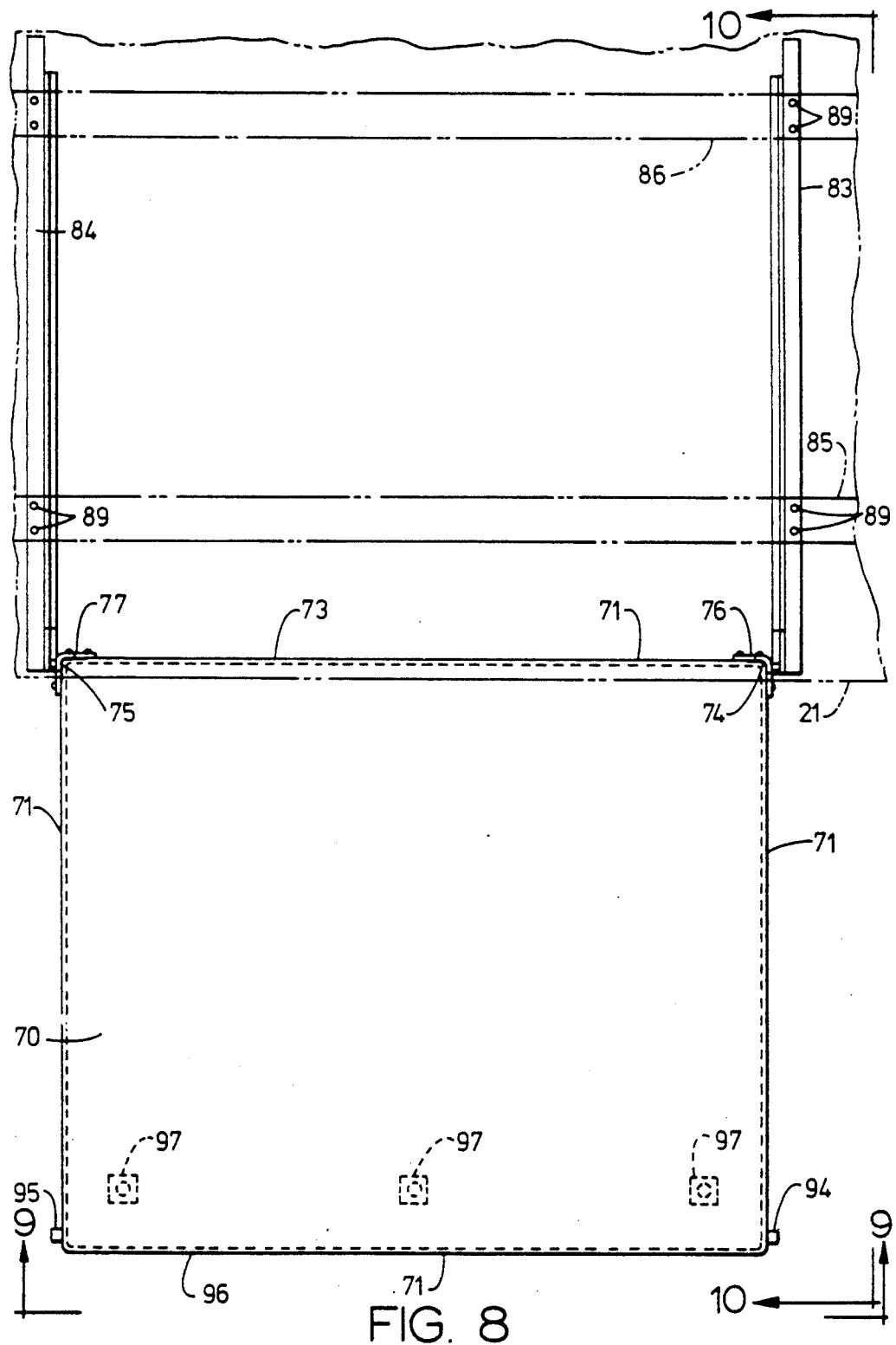
FIG. 8 is a partial cross-sectional top view of an alternative embodiment of the present invention depicting a one-piece platform adjacent inclined roller tracks, shown in the extended position.
Figure 12:
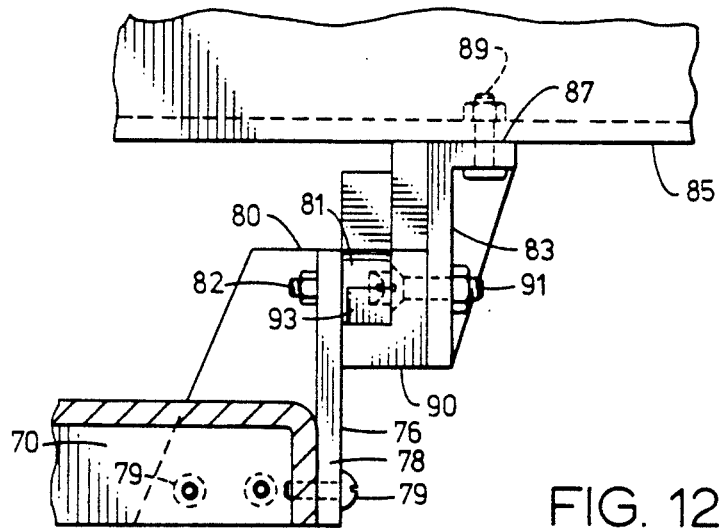
FIG. 12 is an enlarged fragmentary side view showing the roller support carried by the platform (and leg) adjacent the roller track.

Referring to FIG. 8, a top view of an alternative embodiment shows a one-piece patio 70 in a position extended fully from a recreational vehicle 21. Patio 70 is made of a one-piece molded material having edge flanges 71 depending vertically downward from flat portion 72 of patio 70. Edge flanges 71 provide integral support to strengthen the one-piece patio 70. A subframe (not shown) may be used beneath the patio 70 to provide additional strength. Trailing edge 73 of patio 70 terminates in corners 74 and 75. At each corner 74, 75, leg members 76, 77 are secured to patio 70, respectively. As shown in FIG. 12, leg member 76 has a base 78 which is secured to patio 70 by a plurality of fasteners 79. Leg member 76 is formed in an angle to receive and support corner 74. Leg member 76 also has a distal end 80, to which roller 81 is rotatably secured by fastener 82. Referring also to FIG. 8, a pair of spaced-apart support members 83, 84 are secured to the frame rails 85, 86 or other suitable members of recreational vehicle 21. The upper surface 87, 88 of support members 83, 84, respectively, are secured each to the lower surface of frame rails 85, 86. This may be accomplished through the use of fasteners 89 or may simply be welded.

Referring again to FIG. 12, which shows the right side support member 83 as depicted in FIG. 8, a roller track 90 is secured to support member 83 by a plurality of fasteners 91. As shown in FIG. 10 and FIG. 11, roller track 90 is inclined relative to the top surface 87 of support member 83. The last portion 92 of roller track 90 may be parallel, or, that is, not inclined with respect to upper surface 87 of support member 83. A stop 93 may be provided to prevent roller 81 from exiting roller track 90. Stop 93 may be placed adjacent last portion 92 of roller track 90 such that the only lateral motion of patio 70 which can occur when in the fully extended position can only cause roller 81 to travel up the incline of roller track 90.

Figure 9:
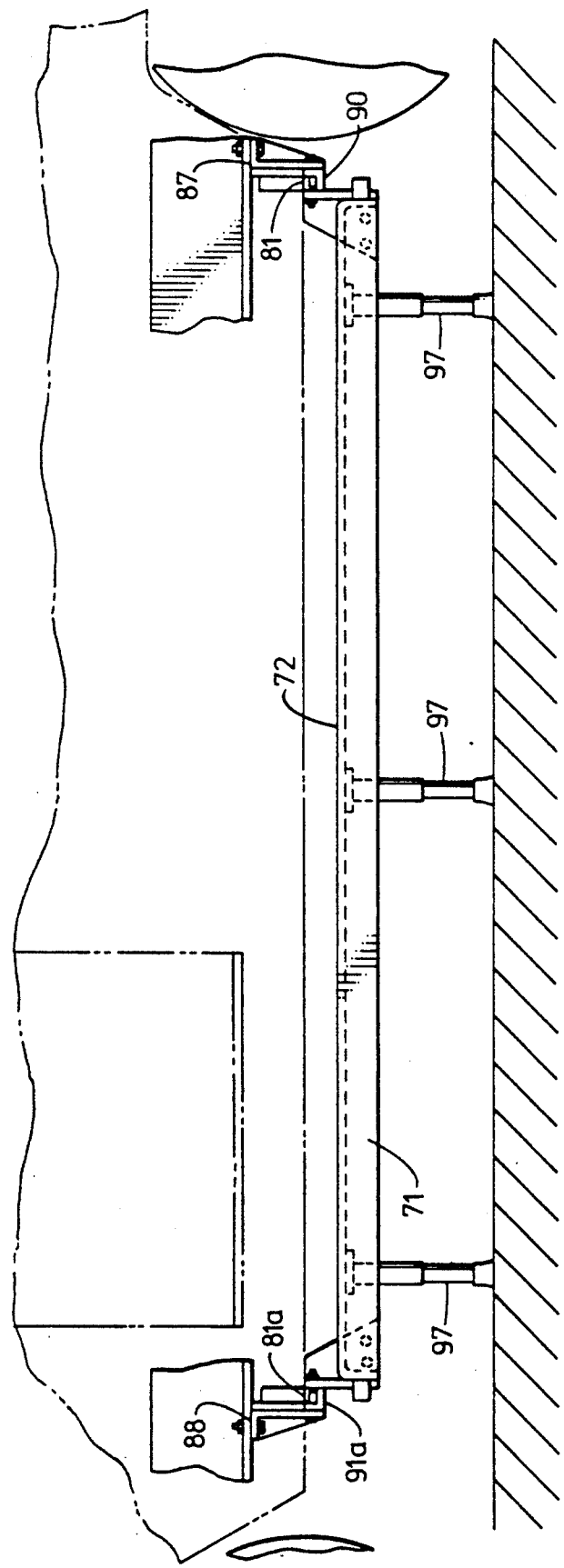
FIG. 9 is a side view of the patio taken along lines 9 of FIG. 8.

Although only the right side of the supporting structure for patio 70 has been illustrated in FIGS. 10, 11, and 12, one skilled in the art will immediately appreciate that a symmetrical support structure is placed on the left side of patio 70, as illustrated in FIGS. 8 and 9. The description contained herein in association with FIGS. 10, 11 and 12 are equally applicable to the left side supporting structure of patio 70.

Patio 70 is disposed between supporting members 83, 84 such that it may be moved between an extended position and a stowed position, thereby causing rollers 81, 81A to rotate or slide as they move along roller track 90 and 90A. In the stored position, patio 70 is secured at edge 76 in roller track 90, 90A, adjacent stops 93, 93A (not shown) by pins 94, 95 located at either end of edge 96. As can be appreciated by one skilled in the art, stop 93 and/or pins 94, 95 are designed to prevent accidental or unintentional extension of patio 70.

A plurality of legs 97 depend vertically downward from the underside of patio 70. As previously described, the legs may be movable between an extended position and a stored position. Also as is well known in the art, the legs may be self-leveling, containing integral to the legs mechanisms as are known in the art for adjusting the height of each leg independent of the other legs. Additionally, as is known in the art, the legs may be adapted to automatically adjust their height to maintain patio 70 in as nearly a horizontal position as is possible.

As can be readily appreciated from the figures above and the descriptions associated with therewith, either embodiment depicted herein could be practiced with a one-piece, two-piece, or a multiple-piece patio, adapted to the particular supporting framework and sizes. As would also be appreciated by one skilled in the art, the rollers attached to the leading edge of the patio in either embodiment may be disposed either horizontally outward as shown or horizontally inward.

The foregoing description of preferred embodiments of the invention have been presented for purposes of illustration and description. It is not intended to be exhaustive or to limit the invention to the precise forms disclosed. Obvious modifications or variations are possible in light of the above teachings. The embodiments were chosen and described in order to best illustrate principles of the invention and its practical application to thereby enable one of ordinary skill in the art to best utilize the invention in various embodiments and with various modifications as are suited to the particular use contemplated. It is intended that the scope of the invention be defined by the claims appended hereto.

What I claim is:

1. A stowable patio which is movable between a stored position and an extended position, comprising:
   (a) a pair of spaced-apart support members disposed generally parallel to each other and generally horizontally, each of said support members having respective substantially vertical interior surfaces and exterior surfaces, and substantially horizontal upper surfaces, each of said interior surfaces disposed to face each other;
   (b) first and second roller tracks, each respective roller track having a generally L-shaped cross-section of unitary construction which includes a first portion and a second portion which depends perpendicularly from said first portion, said first portion of said first roller track being attached to said interior surface of said first support member, said first portion of said second roller track being attached to said interior surface of said second support member, each of said second portions of each respective said roller track being inclined downwardly in the direction of travel from the stored position to the extended position for at least a portion of their length in relation to said upper surfaces of said support members, each of said second portions terminating in a non-inclined portion at their respective lowest ends;
   (c) a first platform disposed between said support members, said platform being movable between the stored position and the extended position;
   (d) a first leg, said first leg having a base, said base being secured to said platform, said first leg having a distal end extending outwardly from said base, said first leg carrying at least one roller rotatably secured to said distal end, said roller being disposed in contact with said second portion of said first roller track; and
   (e) a second leg, said second leg having a base secured to said first platform, said second leg having a distal end extending outwardly from said first platform, said second leg carrying at least one roller rotatably secured to said distal end, said roller being disposed in contact with said second portion of said second roller track;

whereby said first platform may be moved between the stored position and the extended position while said rollers remain in contact with said respective portions of said roller tracks.

2. The patio of claim 1 further comprising a second platform pivotably connected to said first platform, said second platform being pivotable between a stored position and an extended position in relation to said first platform, whereby said second platform may be pivoted into an extended position when said first platform is also in an extended position.

3. The patio of claim 1 further comprising a plurality of legs extending downwardly from said platform.

4. The patio as claimed in claim 3 wherein said legs are movable between a stored position and an extended position.

5. The patio as claimed in claim 2 further comprising means for temporarily locking said second platform into said extended position in relation to said first platform.

6. The patio as claimed in claim 5 wherein said locking means comprises:
a) a first locking member secured to said first platform;
b) a second locking member aligned with said first locking member, said second locking members being secured to said second platform; and
c) locking means for engaging said first locking member and said locking member thereby preventing relative motion between said first and second platforms.

7. The patio as claimed in claim 2 further comprising a plurality of legs extending downwardly from said first and second platforms.

8. The patio as claimed in claim 2 wherein said second platform is pivotable in about an axis generally perpendicular to said support members.

9. The patio as claimed in claim 2 wherein said second platform is pivotable about an axis generally parallel to said support members.

10. The patio as claimed in claim 1 further comprising an enclosure disposed to contain said patio in said stored position.

* * * * *